Sept. 28, 1943.  J. OLASZY  2,330,733
AIR TERMINAL TAKE-OFF DEVICE
Filed April 30, 1941
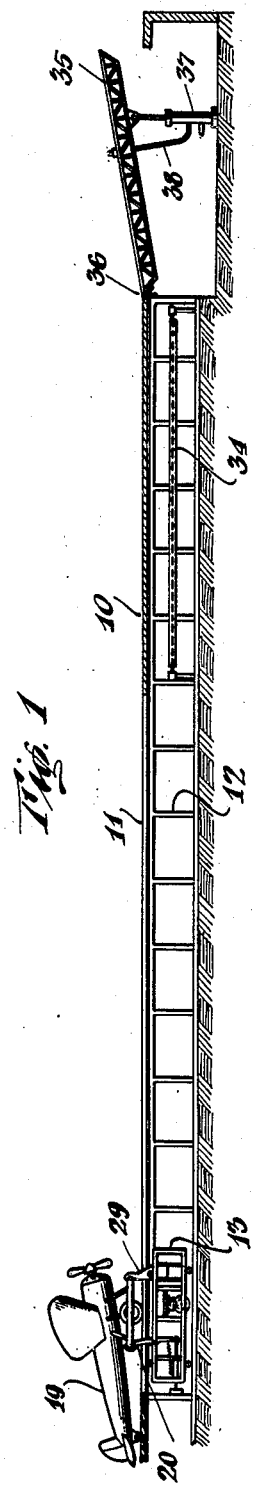
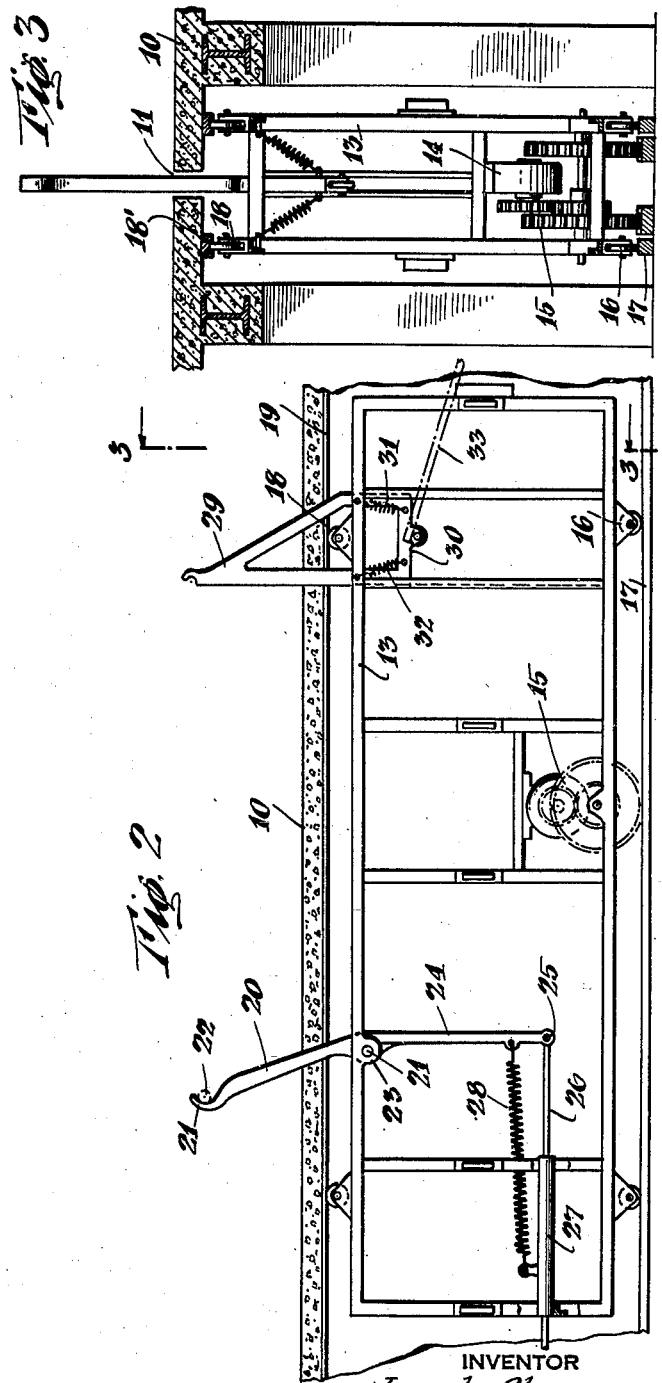
INVENTOR
Joseph Olaszy
BY
ATTORNEY Patented Sept. 28, 1943

2,330,733

UNITED STATES PATENT OFFICE 2,330,733

AIR TERMINAL TAKE-OFF DEVICE

Joseph Olaszy, New York, N. Y.

Application April 30, 1941, Serial No. 391,053

3 Claims. (Cl. 244—63)

This invention relates to an air terminal take off device, and it is the principal object of my invention to provide a novel and improved runway for the launching of aircraft of various types by the intermediary of a raised portion of the runway at the end thereof.

Another object of my invention is the provision of a device of this character including a slotted platform for supporting the aircraft and connecting it to a motor operated carriage guided beneath said platform to a device for releasing the aircraft from said carriage before the same is taking the air from the raised and suitably inclined portion of the platform.

It will be clear that any number of such platforms may be erected to suit the respective requirements of an airdrome or field.

A further object of my invention is the provision of a device of the above type equipped with a means for hydraulically effecting the raising of the movable part of the runway whereby the plane leaving the same automatically operates the releasing valve for the hydraulic medium.

A still further object of my invention is the provision of an air terminal take off device including means for holding an airplane safely to its carriage until its speed is sufficient for taking the air. The inclined portion of the runway has for its object to provide a means for materially shortening the climbing period by giving to the airplane a suitable inclination when leaving the runway, and thus allowing a material shortening of the take off runways.

These and other objects of my invention will become more fully known as well as the advantages derived therefrom as the description proceeds, and will then be more specifically defined in the accompanying claims.

In the accompanying drawing, forming a material part of this disclosure:

Fig. 1 is a side elevation, partly in section of a platform for an air terminal take off device constructed according to my invention showing at one end thereof the upwardly inclined take off portion of the platform raised by means of a hydraulically operated jack, and showing at its other end an airplane held to a motor driven carriage.

Fig. 2 is a side elevation of the motor driven carriage on a greatly enlarged scale.

Fig. 3 is a section on line 3—3 of Figure 2.

As illustrated, a platform or runway 10 of suitable length and material has a centrally located, longitudinally extending slot 11 serving a purpose more fully to be described hereinafter.

The platform may be provided in any number to suit the local requirements and is preferably supported above the ground by means of a plurality of posts or pillars 12.

A carriage 13 beneath said platform is preferably driven by means of a motor within its casing 14 and by the intermediary of a gear mechanism, generally designated 15, of any well known suitable type. The carriage is running on the pairwise arranged, lower wheels 16 running on the rails 17, and also pairwise arranged upper wheels or rollers 18 running on the rails 18' beneath the platform top.

The airplane of any type, designated 19, is held by means of a lever 20 pivoted at its lower end to a carriage bar as at 21, and has at its upper end a hook 21' engaging a suitable member of the airplane indicated at 22. The lower, rounded end 23 of the lever 20 engages and operates a bar 24 of the carriage frame to the lower end of which is pivoted, as at 25, one end of a plunger 26 passing through a conduit 27 located between two posts of the carriage frame, and having an eye in which one end of a spring is secured, the other end of which is attached to the bar 24. The spring 28 is expanded by the proper operation of the lever 20, and when contracting will push the plunger out of the conduit 27 through a slot in which the eye protrudes from the plunger to which one end of the spring is secured.

Another lever 29 of substantially triangular form is mounted on the carriage for up and down movement to extend through the slot in the platform, and engages with its upper end a member of the airplane as indicated in Figure 1. The base bar 30 of the lever frame has springs 31 and 32 attached thereto at one of their ends, while their other ends are secured to the carriage frame, and a lever 33 is operated by means of a hydraulically operated brake system, as for instance described and shown in my Patent No. 1,997,945 and designated here generally by the reference character 34.

To the end of the platform 10 is pivotally attached a runway 35, as at 36, which is held in its upwardly directed, inclined position by means of the hydraulic jack 37, equipped with a valve operating lever 38 adapted to be engaged by a suitable part on the airplane.

The device operates as follows:

The airplane is placed on the platform and secured to the carriage by means of the levers 20 and 29 as shown in Figure 1. Then the lever 20 is released from its engagement with the airplane and turned about its pivot point to engage bar 24 to turn the same about point 25 to tension spring 28 and retract the plunger. When released, the spring will expand and push plunger outwardly to engage a rear wall so that the plunger will impart the carriage motor impetus enough to start the same and the carriage will move forward with the airplane connected thereto by lever 29 traveling in the slot 11 of the platform, until it reaches the brake releasing system 34 pulling the lever 29 down, to release the airplane to freely proceed under its own power. The inclined runway 35 has been previously elevated to a desired and required elevation and inclination, so that the airplane will then be free to take the air. The airplane will receive during its travel along the inclined end of the platform an upwardly inclined position and start to climb as soon as it leaves the inclined end, and thus the period of climbing to a certain altitude will be considerably shortened, while the length of the runway can be considerably shortened.

During the take off, a lever on the airplane will engage the lever 38 of the release valve and open the same to release the hydraulic medium so that the jack will allow a lowering of the runway 35.

It will be understood that I have described and shown the preferred form of my device as one example only of the many possible ways to practically construct the same, and that I may make such changes in the general arrangement and in the construction of the minor details of my device as come within the scope of the appended claims without departure from the spirit of my invention and the principles involved.

Having thus described my invention, what I claim as new and desire to secure by Letters Patent is:

1. An air terminal take off device as described comprising a platform having a longitudinal median slot and supporting an airplane, posts to support said platform above the ground, a motor driven carriage beneath said platform, a lever on said carriage engaging a member of the airplane for manual operation, an inclined runway movably connected to the outer end of said platform, a second lever connected to the carriage and the airplane and traveling in the slot of said platform, a means to release the airplane from said platform before ascending the runway under its own power, a hydraulic jack to hold said runway in an upwardly inclined position with the airplane thereon at such an angle to the horizontal plane as to facilitate its climbing when leaving the runway, and a spring-controlled plunger on said carriage to start the motor of the carriage upon the release of the airplane by said first named lever.

2. In an air terminal take off device of the character described a longitudinally slotted platform, a plurality of posts or standards to hold the platform above the ground, levers extending through said slot in the platform to secure an airplane in position on the platform, a motor driven carriage traveling on rollers along rails beneath said platform, one of said levers connecting said carriage with a member of the airplane for manual operation, and the other also connected to said carriage and said airplane traveling in the slot of said platform, means for operating the second lever to release the airplane before leaving the platform under its own power, a spring operated plunger actuated upon the manual operation of said first named lever for starting the motor to propel the carriage along said platform with the airplane connected thereto by said second lever, and an upwardly inclined runway or take off at the outer end of said platform movably connected thereto for facilitating the initial climbing impetus of the airplane after leaving the platform, and means to hold the runway in its inclined position.

3. In an air terminal take off device as described, including an elevated platform or runway, a motor operated carriage beneath said runway, lever connections between said carriage and an airplane on said runway, a plunger actuated upon the manual operation of said lever connections and operating in a conduit on said carriage under spring control to start the motor of the carriage upon the release of one of said lever connections by hand while the other is still connecting the carriage and airplane, a movable platform hinged to said runway and normally held in an upwardly inclined position by a jack, a means for releasing the second lever connection as soon as the airplane reaches the movable platform with its upper or front end elevated at an angle to the horizon to facilitate its initial climbing motion and thus allowing a restriction of the length of said runway.

JOS. OLASZY.